US008939371B2

(12) United States Patent
Barkan

(10) Patent No.: US 8,939,371 B2
(45) Date of Patent: Jan. 27, 2015

(54) INDIVIDUAL EXPOSURE CONTROL OVER INDIVIDUALLY ILLUMINATED SUBFIELDS OF VIEW SPLIT FROM AN IMAGER IN A POINT-OF-TRANSACTION WORKSTATION

(75) Inventor: Edward Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 210 days.

(21) Appl. No.: 13/173,640

(22) Filed: Jun. 30, 2011

(65) Prior Publication Data
US 2013/0001309 A1   Jan. 3, 2013

(51) Int. Cl.
G06K 7/10   (2006.01)

(52) U.S. Cl.
CPC ........ *G06K 7/10732* (2013.01); *G06K 7/10722* (2013.01); *G06K 7/10752* (2013.01); *G06K 7/1096* (2013.01)
USPC .......................................... 235/455; 235/454

(58) Field of Classification Search
USPC .......................................... 235/454, 455, 462
See application file for complete search history.

(56) References Cited

U.S. PATENT DOCUMENTS

| | | |
|---|---|---|
| 4,613,895 A | 9/1986 | Burkey et al. |
| 4,639,606 A | 1/1987 | Boles et al. |
| 4,794,239 A | 12/1988 | Allais |
| 4,818,856 A | 4/1989 | Matsushima et al. |
| 5,059,779 A | 10/1991 | Krichever et al. |
| 5,124,539 A | 6/1992 | Krichever et al. |
| 5,200,599 A | 4/1993 | Krichever et al. |
| 5,304,786 A | 4/1994 | Pavlidis et al. |
| 5,331,142 A | 7/1994 | Takenaka |
| 5,510,607 A | 4/1996 | Ishikawa |
| 5,559,562 A | 9/1996 | Ferster |
| 5,703,349 A | 12/1997 | Meyerson et al. |
| 5,717,195 A | 2/1998 | Feng et al. |

(Continued)

FOREIGN PATENT DOCUMENTS

| | | |
|---|---|---|
| WO | 2006062818 A2 | 6/2006 |
| WO | 2009006419 A1 | 1/2009 |

OTHER PUBLICATIONS

International Search Report and Written Opinion for International Patent Application No. PCT/US2010/029001 mailed on Aug. 20, 2010.

(Continued)

*Primary Examiner* — Daniel Hess
*Assistant Examiner* — Tabitha Chedekel
(74) *Attorney, Agent, or Firm* — Nong-Qiang Fan

(57) ABSTRACT

A bi-optical, dual window, point-of-transaction workstation images indicia associated with multi-sided products by splitting the field of view of each imager into a plurality of subfields that simultaneously extend through each window over regions of the product. A plurality of energizable illuminators, one for each subfield, illuminates each subfield with illumination light over an adjustable illumination time. The illumination light returned from the indicia in each subfield is captured along respective optical paths from each window to each imager. A plurality of exposure sensors, one for each subfield, and located externally of each imager, senses the returned illumination light in each subfield. A controller energizes each illuminator to illuminate each subfield, deenergizes each illuminator when the returned illumination light sensed by the respective exposure sensors exceeds a threshold, and processes the captured illumination light in at least one of the subfields.

13 Claims, 16 Drawing Sheets

(56) References Cited

U.S. PATENT DOCUMENTS

| | | | |
|---|---|---|---|
| 5,869,827 | A | 2/1999 | Rando |
| 6,065,678 | A | 5/2000 | Li et al. |
| 6,141,062 | A | 10/2000 | Hall et al. |
| 6,189,795 | B1 | 2/2001 | Ohkawa et al. |
| 6,296,187 | B1 | 10/2001 | Shearer |
| 6,491,224 | B2 | 12/2002 | Ohkawa et al. |
| 6,924,807 | B2 | 8/2005 | Ebihara et al. |
| 7,076,097 | B2 | 7/2006 | Kondo et al. |
| 7,116,353 | B2 | 10/2006 | Hobson et al. |
| 7,191,947 | B2 | 3/2007 | Kahn et al. |
| 7,280,124 | B2 | 10/2007 | Laufer et al. |
| 7,296,744 | B2 | 11/2007 | He et al. |
| 7,344,080 | B2 | 3/2008 | Vinogradov et al. |
| 7,357,325 | B2 | 4/2008 | Zhu et al. |
| 7,430,682 | B2 | 9/2008 | Carlson et al. |
| 7,475,823 | B2 | 1/2009 | Brock et al. |
| 7,527,207 | B2 | 5/2009 | Acosta et al. |
| 7,757,955 | B2 | 7/2010 | Barkan |
| 7,823,787 | B2 | 11/2010 | He et al. |
| 8,146,821 | B2 | 4/2012 | Barkan et al. |
| 8,424,767 | B2 | 4/2013 | Barkan et al. |
| 2001/0042789 | A1 | 11/2001 | Krichever et al. |
| 2002/0038820 | A1 | 4/2002 | Check et al. |
| 2002/0056750 | A1 | 5/2002 | Kato et al. |
| 2002/0125317 | A1 | 9/2002 | Hussey et al. |
| 2002/0179713 | A1 | 12/2002 | Pettinelli et al. |
| 2003/0029915 | A1 | 2/2003 | Barkan et al. |
| 2003/0090805 | A1 | 5/2003 | Ohkawa et al. |
| 2003/0189664 | A1 | 10/2003 | Olsson |
| 2004/0146211 | A1 | 7/2004 | Knapp et al. |
| 2004/0256465 | A1 | 12/2004 | Longacre |
| 2005/0001035 | A1 | 1/2005 | Hawley et al. |
| 2005/0162385 | A1 | 7/2005 | Doi et al. |
| 2005/0259746 | A1 | 11/2005 | Shinde et al. |
| 2006/0022051 | A1 | 2/2006 | Patel et al. |
| 2006/0118627 | A1 | 6/2006 | Joseph et al. |
| 2006/0118628 | A1* | 6/2006 | He et al. .......... 235/454 |
| 2007/0079029 | A1 | 4/2007 | Carlson et al. |
| 2007/0176003 | A1 | 8/2007 | Brock |
| 2007/0252078 | A1* | 11/2007 | Kaltenbach et al. ...... 250/236 |
| 2007/0272756 | A1 | 11/2007 | Brock et al. |
| 2008/0105745 | A1 | 5/2008 | Lei |
| 2008/0179402 | A1 | 7/2008 | Barkan et al. |
| 2009/0020611 | A1 | 1/2009 | Sackett et al. |
| 2009/0020612 | A1 | 1/2009 | Drzymala et al. |
| 2009/0026271 | A1 | 1/2009 | Drzymala et al. |
| 2009/0078775 | A1 | 3/2009 | Giebel et al. |
| 2009/0084854 | A1 | 4/2009 | Carlson et al. |
| 2009/0101719 | A1 | 4/2009 | Knowles et al. |
| 2009/0159683 | A1 | 6/2009 | Roquemore et al. |
| 2009/0206161 | A1 | 8/2009 | Olmstead |
| 2009/0272810 | A1 | 11/2009 | Barkan |
| 2010/0019042 | A1 | 1/2010 | Barkan |
| 2010/0019043 | A1 | 1/2010 | Sackett et al. |
| 2010/0102129 | A1 | 4/2010 | Drzymala et al. |
| 2010/0116887 | A1 | 5/2010 | Barkan et al. |
| 2010/0147953 | A1 | 6/2010 | Barkan |
| 2010/0155484 | A1 | 6/2010 | Gregerson |
| 2010/0163626 | A1* | 7/2010 | Olmstead .......... 235/462.41 |
| 2010/0187313 | A1 | 7/2010 | He et al. |
| 2010/0200656 | A1 | 8/2010 | Marshall et al. |
| 2010/0252633 | A1 | 10/2010 | Barkan et al. |
| 2010/0252635 | A1 | 10/2010 | Drzymala et al. |
| 2011/0024505 | A1 | 2/2011 | Wang et al. |
| 2011/0127333 | A1 | 6/2011 | Veksland et al. |

OTHER PUBLICATIONS

Non Final Office Action mailed Jun. 24, 2011 in counterpart U.S. Appl. No. 12/417,287, Edward D. Barkan, filed Apr. 2, 2009.

Notice of Allowance mailed Dec. 21, 2011 in counterpart U.S. Appl. No. 12/417,287, Edward D. Barkan, filed Apr. 2, 2009.

International Preliminary Report on Patentability and Written Opinion for International Patent Application No. PCT/US2010/029001 mailed on Oct. 13, 2011.

International Preliminary Report on Patentability and Written Opinion for International Patent Application No. PCT/US2009/049166 issued on Jan. 25, 2011.

International Search Report and Written Opinion for International Patent Application No. PCT/US2009/049166 mailed on Sep. 21, 2009.

Non Final Office Action mailed on Aug. 19, 2009 in U.S. Appl. No. 12/220,333, William Sackett, filed Jul. 23, 2008.

Final Office Action mailed on Feb. 8, 2010 in U.S. Appl. No. 12/220,333, William Sackett, filed Jul. 23, 2008.

Notice of Allowance mailed on Jan. 29, 2013 in related U.S. Appl. No. 13/411,815, Edward D Barkan, filed Mar. 5, 2012.

International Search Report for counterpart Patent Application No. PCT/US2012/44182 mailed on Nov. 19, 2012.

Office Action mailed Sep. 4, 2013 in counterpart European Patent Application No. 10 726 689.2.

Office Action mailed Jul. 15, 2014 in counterpart European Patent Application No. 10 726 689.2.

* cited by examiner

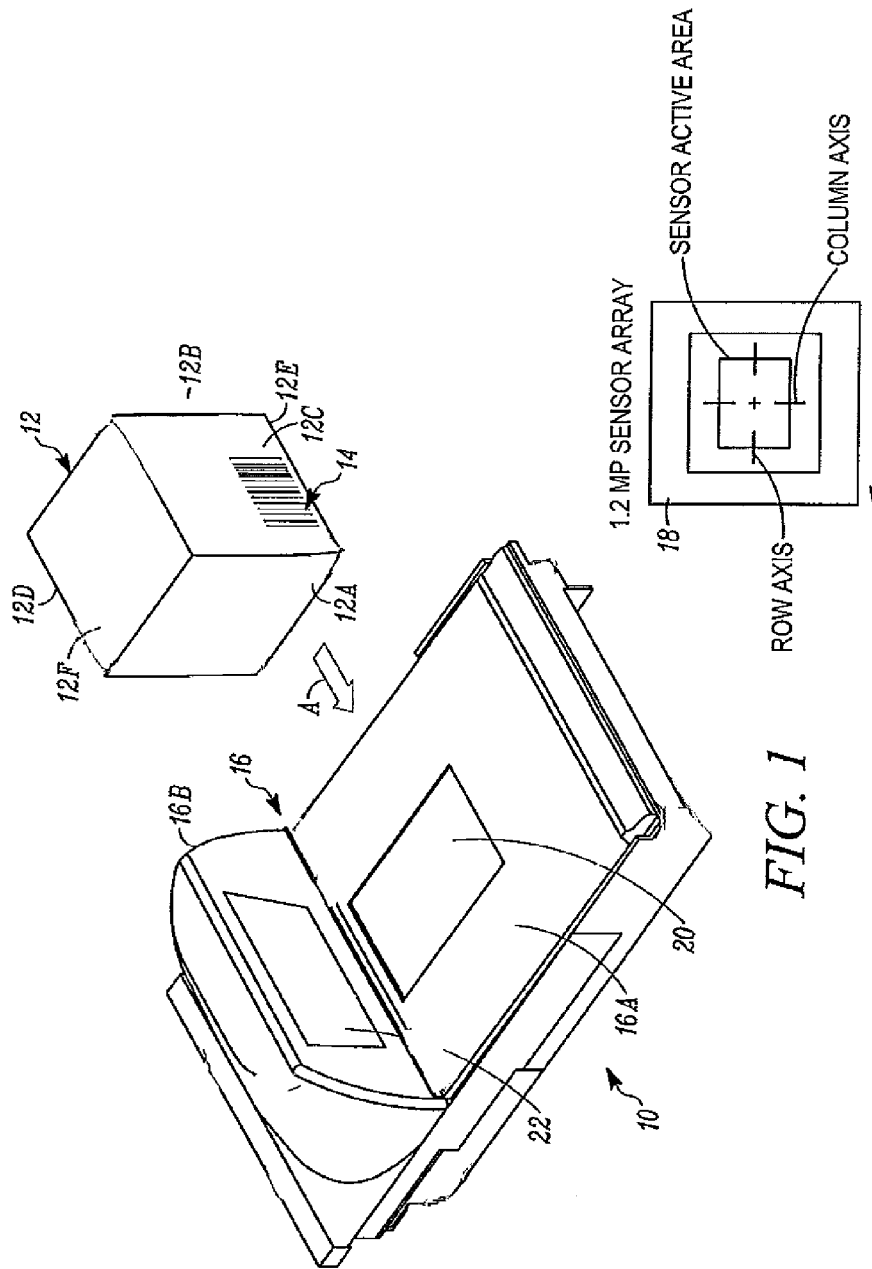

INDIVIDUAL EXPOSURE CONTROL OVER INDIVIDUALLY ILLUMINATED SUBFIELDS OF VIEW SPLIT FROM AN IMAGER IN A POINT-OF-TRANSACTION WORKSTATION

BACKGROUND OF THE INVENTION

It is known to use laser-based and/or imager-based readers or scanners in a dual window or bi-optical workstation to electro-optically read indicia, such as bar code symbols, associated with three-dimensional products to be identified and processed, e.g., purchased, at a point-of-transaction workstation provided at a countertop of a checkout stand in supermarkets, warehouse clubs, department stores, and other kinds of retailers. The products are typically slid or moved by a user across, or presented to a central region of, a generally horizontal window that faces upwardly above the countertop and/or a generally vertical or upright window that rises above the countertop. When at least one laser scan line generated by a laser-based reader sweeps over a symbol and/or when return light from a symbol is captured over a field of view by a solid-state imager of an imager-based reader, the symbol is then processed, decoded and read, thereby identifying the product.

The symbol may be located low or high, or right to left, on the product, or anywhere in between, on any of six sides of the product. The symbol may be oriented in a "picket fence" orientation in which elongated parallel bars of a one-dimensional Universal Product Code (UPC) symbol are vertical, or in a "ladder" orientation in which the UPC symbol bars are horizontal, or at any orientation angle in between. The products may be held by the user at various tilt angles during their movement across, or presentation to, either window. The products may be positioned either in contact with, or held at a working distance away from, either window during such movement or presentation. All these factors make the symbol location variable and difficult to predict in advance.

As advantageous as workstations with laser-based readers have been in processing transactions, workstations with imager-based readers, also known as imagers or cameras, are thought to offer improved reliability and have the added capability of reading indicia other than UPC symbols, such as two-dimensional or stacked or truncated symbols, as well as the capability of imaging non-symbol targets, such as receipts, driver's licenses, signatures, etc. It was initially thought that an all imager-based workstation would require about ten to twelve, or at least six, imagers in order to provide a full coverage scan zone to enable reliable reading of indicia that could be positioned anywhere on all six sides of a three-dimensional product. The scan zone extends above the horizontal window and in front of the upright window as close as possible to the countertop, and sufficiently high above the countertop, and as wide as possible across the width of the countertop. The scan zone projects into space away from the windows and grows in volume rapidly in order to cover indicia on products that are positioned not only on the windows, but also many inches therefrom.

Each imager includes an array of image sensors, and typically has an associated illuminator to illuminate the indicia with illumination light. The image sensors detect the return illumination light reflected and/or scattered from the indicia. Each imager includes either a global or a rolling shutter to help prevent image blur, especially when the indicia passes through the scan zone at high speed, e.g., on the order of 100 inches per second. To insure good reading performance, each imager must be properly exposed, and such aforementioned variable factors as the working distance, orientation, speed and position of the indicia, as well as the light transmissivity of each window, must be taken into account. To achieve such proper exposure, it is known to provide an imager with an internal auto-exposure circuit for measuring the intensity level of the return illumination light in the field of view of the imager, and for adjusting the exposure duration of the imager.

As advantageous as such an internal auto-exposure circuit is, it only adjusts the exposure duration of the imager in which it is internally integrated. To bring the cost of the imager-based workstation down to an acceptable level, it is known to reduce the need for the aforementioned six to twelve imagers down to two imagers, or even one imager, by splitting the field of view of at least one imager into a plurality of subfields of view, each additional subfield serving to replace an additional imager. Each such subfield of view, also known as a light collection region, is illuminated and extends through at least one window over regions of the product. However, a single auto-exposure circuit internal to a single imager can only measure the illumination light intensity level in a single field of view, and cannot measure all the illumination light intensity levels in all of the subfields of view split by a single imager.

SUMMARY OF THE INVENTION

This invention relates to a point-of-transaction workstation for electro-optically imaging indicia associated with multi-sided products. The indicia are preferably bar code symbols that are electro-optically read in order to identify products being purchased at the workstation. In a preferred embodiment, the workstation is a bi-optical or dual window workstation having a generally horizontal window supported by a housing and located in a generally horizontal plane, and an upright window, also supported by the housing, and located in a generally upright plane that intersects the generally horizontal plane. The upright plane may lie in a vertical plane, or be slightly rearwardly or forwardly inclined relative to the vertical plane. The products are passed by an operator or a customer through a scan zone, which occupies the space at and above the horizontal window, and also occupies the space at and in front of the upright window.

At least one solid-state imager, and preferably two solid-state imagers, one for, and associated with, each window, are supported by the housing. Preferably, both imagers are commonly mounted on a printed circuit board. Each imager has a sensor array of image sensors (also known as pixels) with a field of view. Each imager preferably comprises a two-dimensional, charge coupled device (CCD) array, or a complementary metal oxide semiconductor (CMOS) array, of image sensors of megapixel size, e.g., 1280 pixels wide×960 pixels high. The array of image sensors is arranged along mutually perpendicular array axes, i.e., a row axis and a column axis. Each imager includes an imaging lens assembly for capturing return light from the indicia and for projecting the captured return light onto the sensor array. Each imager has an electronic shutter, typically a global shutter, that exposes the imager for an exposure time, preferably pre-set for the maximum anticipated exposure time needed to capture indicia at the maximum working distance away from the window. By way of example, the maximum exposure time can be set to a value between 400-750 microseconds. Each imager preferably operates at a frame rate of sixty frames per second, each frame lasting about 16.67 milliseconds.

An optical system is supported by the housing and is operative for splitting the field of view of at least one of the imagers into a plurality of subfields of view that extend through at least one of the windows over regions of the product. Preferably, the optical system includes a first optical splitter for splitting the field of view of one of the imagers into three subfields of view that pass through one of the windows, and a second optical splitter for splitting the other field of view of the other imager into another three subfields of view that pass through the other of the windows. As discussed above, the use of optical splitters reduces the number of imagers in the workstation. Thus, only two imagers are preferably needed to produce six subfields. These six subfields provide optimum visibility of indicia on various sides of a product being passed through the scan zone. The six subfields are oriented to be most effective for reading indicia on products oriented in the most common ways presented to the workstation by users. The six subfields provides redundant coverage for the indicia located in common positions on the products, thereby assuring maximum performance when used by typical users. If a user should present a product in an unusual way, however, such as by positioning the indicia opposite one of the windows, a subfield will still be positioned to read that indicia.

A plurality of energizable illuminators, one for each subfield of view, is operative for illuminating each subfield of view with illumination light over an adjustable illumination time, preferably in a range of about 0.25 to about 0.75 milliseconds. Each illuminator preferably includes multiple illumination light sources, e.g., light emitting diodes (LEDs). The imaging lens assembly is operative for capturing the illumination light returned from the indicia in each subfield of view along respective optical paths from each window to each imager.

In accordance with one feature of this invention, a plurality of exposure sensors, one for each subfield of view, is operative for sensing the returned illumination light in each subfield of view. Each exposure sensor, e.g., a photodetector, is positioned externally of the imagers. For each subfield of view, the associated photodetector and the associated LEDs are preferably commonly mounted on a printed circuit board.

A controller or programmed microprocessor is operatively connected to the imagers, the illuminators, and the exposure sensors, for energizing each illuminator to illuminate each subfield of view, for deenergizing each illuminator when the returned illumination light sensed by the respective exposure sensors exceeds a threshold, and for processing the captured illumination light in at least one of the subfields of view to read the indicia, and to decode the indicia if the indicia is a symbol.

Thus, each subfield of view is illuminated by its own individually dedicated illuminator, and the intensity level of the returned illumination light in each subfield of view is sensed by its own individually dedicated exposure sensor. The illumination time of each illuminator in each subfield of view is separately adjusted. For example, reading indicia in a near range of working distances close to a window will need a shorter illumination time as compared to reading indicia in a far range of working distances remote from the window. Similarly, one subfield may be looking at one side of a product, while another subfield may be looking at another side of the same product. These two product sides will not necessarily be located at the same working distance, and may not even be illuminated to the same extent.

The individual exposure control of this invention allows different exposures in different subfields of view of an imager. A single auto-exposure circuit internal to a single imager cannot provide different exposure times in different portions of its field of view. The individual exposure control of this invention promotes the use of optical splitters and reduces the number of imagers needed in the workstation.

Yet another feature of this invention resides in a method of processing products by electro-optically imaging indicia associated with the products. The method is performed by supporting at least one window and at least one solid-state imager having an array of image sensors with a field of view on a housing; splitting the field of view of the at least one imager into a plurality of subfields of view that simultaneously extend through the at least one window over regions of the product; illuminating each subfield of view with illumination light over an adjustable illumination time with a plurality of energizable illuminators, one for each subfield of view; capturing the illumination light returned from the indicia in each subfield of view along respective optical paths from the at least one window to the at least one imager; sensing the returned illumination light in each subfield of view with a plurality of exposure sensors, one for each subfield of view; positioning the exposure sensors externally of the at least one imager; energizing each illuminator to illuminate each subfield of view; deenergizing each illuminator when the returned illumination light sensed by the respective exposure sensors exceeds a threshold; and processing the captured illumination light in at least one of the subfields of view.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of a dual window, bi-optical, point-of-transaction workstation or imaging reader operative for reading indicia on a multi-sided product passing through the workstation by image capture;

FIG. 2 is a top plan view of a sensor array of an imager for use in the workstation of FIG. 1;

DETAILED DESCRIPTION OF THE PREFERRED EMBODIMENTS

Figure 3:
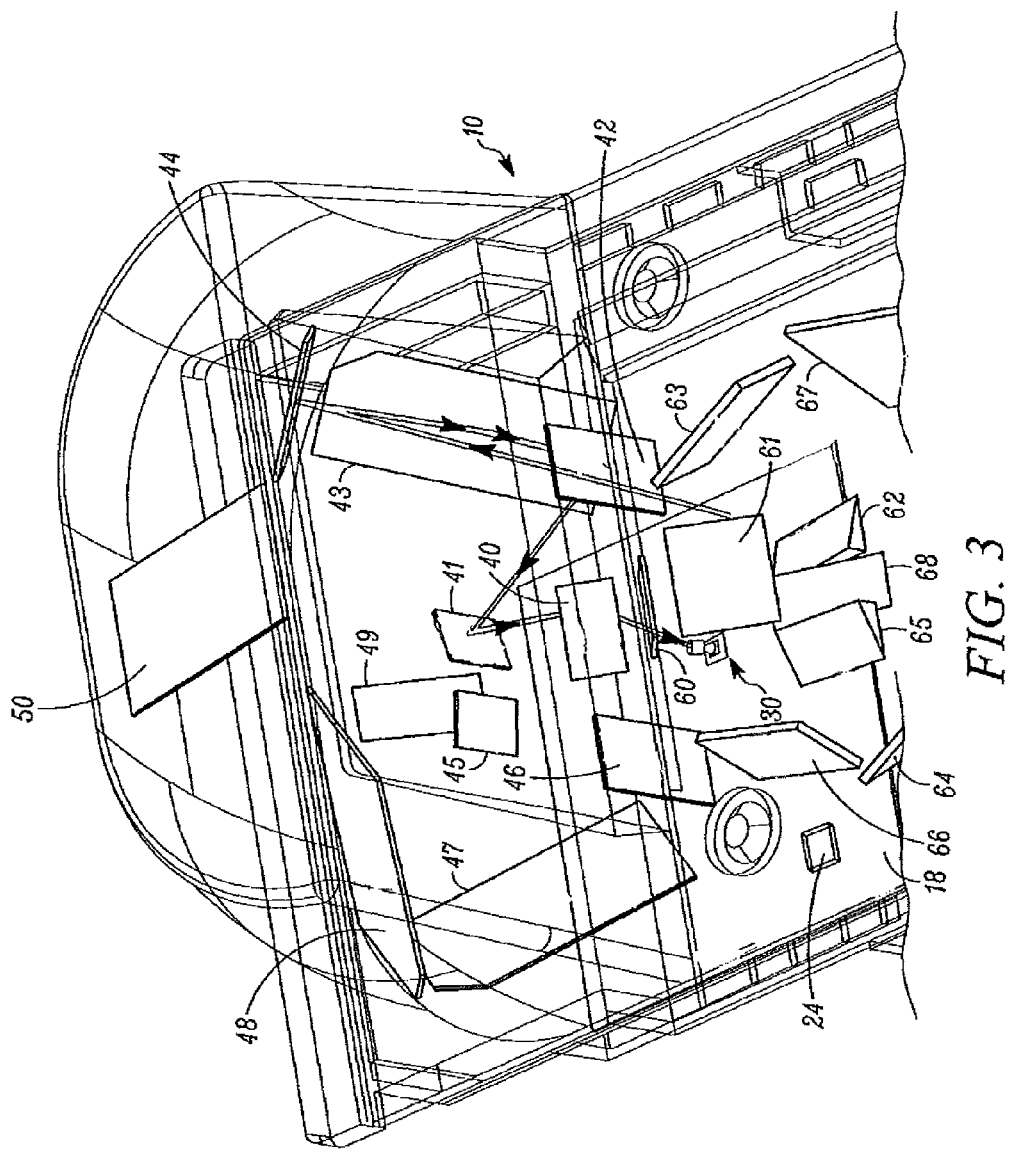
FIG. 3 is a broken-away, enlarged, perspective view of part of an optical system in the workstation of FIG. 1 diagrammatically depicting a folded optical path of an outer subfield of view of the imager of FIG. 2 for exit through an upright window.

FIG. 1 depicts a dual window, bi-optical, point-of-transaction workstation 10 for electro-optically imaging indicia 14 or targets, such as the illustrated UPC symbol described above, associated with multi-sided, three-dimensional products 12, and is typically used by retailers to process transactions involving the purchase of the products 12 bearing, or printed with, the identifying indicia 14. The workstation 10 includes a housing 16 having a generally horizontal window 20 located in a generally horizontal plane and supported by a horizontal housing portion 16A, and an upright window 22 located in a generally upright plane that intersects the generally horizontal plane and supported by a raised housing portion 16B. The upright plane may lie in a vertical plane, or be slightly rearwardly or forwardly inclined relative to the vertical plane. The upright window 22 is preferably recessed within its housing portion 16B to resist scratching. By way of numerical example, the generally horizontal window 20 measures about four inches in width by about six inches in length, while the generally upright window 22 measures about six inches in width by about eight inches in length. The products are passed by an operator or a customer through a scan zone, which occupies the space at and above the horizontal window 20, and also occupies the space at and in front of the upright window 22.

The indicia 14 need not be a UPC symbol as illustrated, but could be another one-dimensional symbol of a different symbology, or any two-dimensional symbol, or stacked symbol, or various lengths of a truncated symbol of the type typically found on frequent shopper cards, coupons, loyalty cards. The indicia 14 could also be a non-symbol target, such as a personal check, a credit card, a debit card, a signature, a driver's license, the consumer himself or herself, or the operator himself or herself. Capturing an image of the driver's license is particularly useful since many licenses are encoded with two-dimensional indicia bearing age information, which is useful in validating a customer's age and the customer's ability to purchase age-related products, such as alcoholic beverages or tobacco products. Capturing an image of the operator is used for video surveillance for security purposes. Thus, it can be determined if the operator is actually scanning the products, or passing them around the windows in an effort to bypass the windows and not charge the customer in a criminal practice known in retailing as "sweethearting".

The product 12 need not be a three-dimensional box as illustrated, but can be any object having a left side 12A, a right side 12B, a front side 12C, a rear side 12D, a bottom side 12E, and a top side 12F. The product 12 is slid or moved by an operator or a customer across and past the windows 20, 22 in the direction of the arrow A through the scan zone, or is presented to a central region of either window. As described above, the product 12 can be tilted or moved in other directions through the workstation 10.

Figure 4:
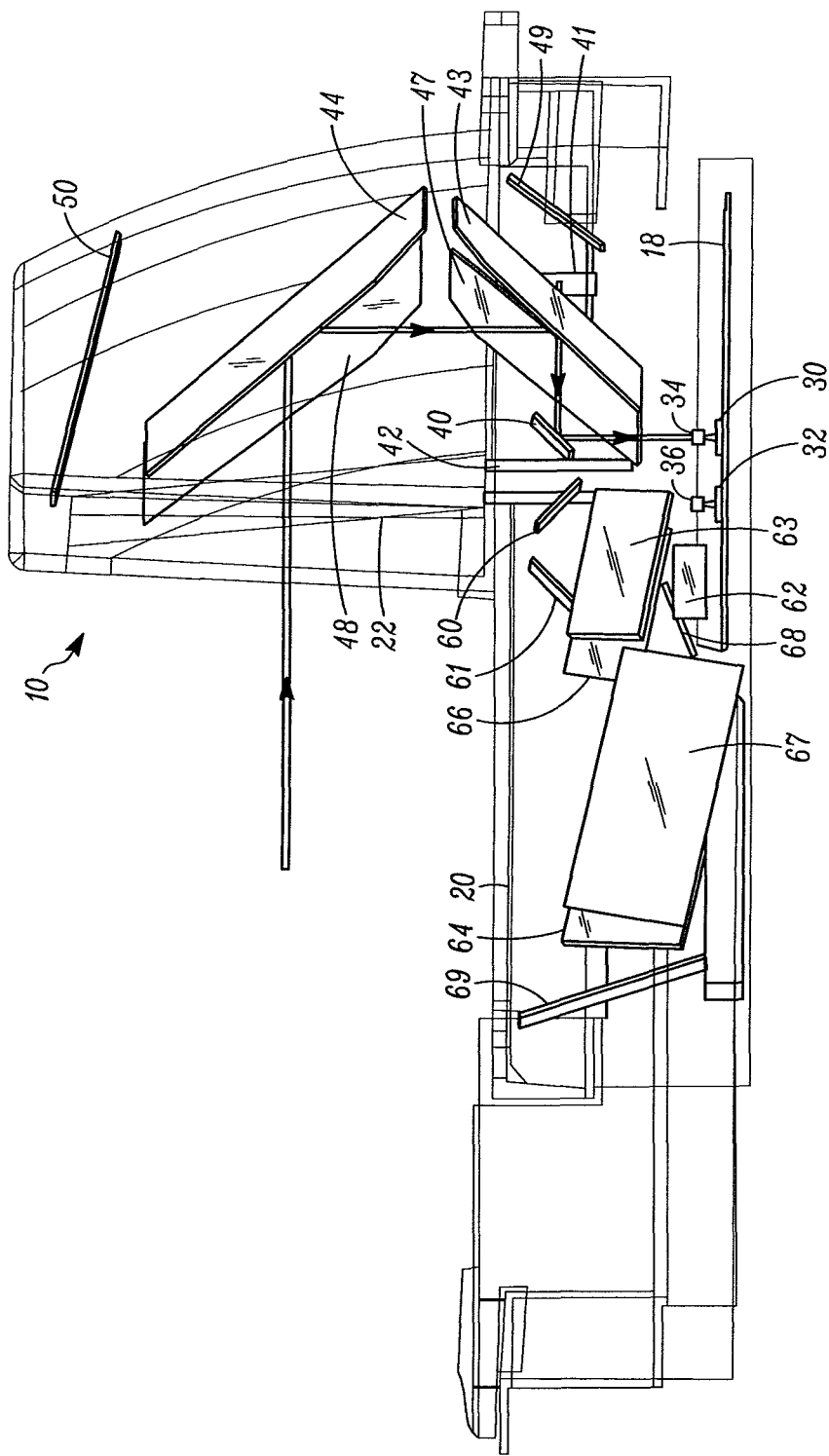
FIG. 4 is a side perspective, enlarged, view of the optical path of FIG. 3.
Figure 14:
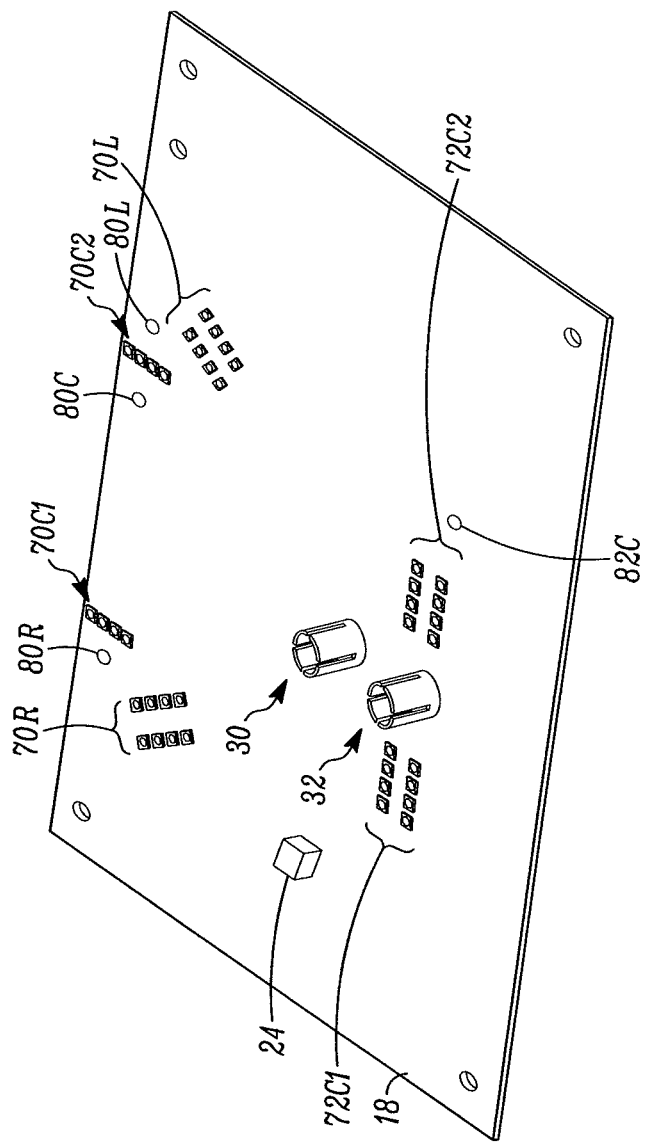
FIG. 14 is a perspective view of a plurality of illuminators and a plurality of exposure sensors commonly mounted on a main printed circuit board within the workstation of FIG. 1 in accordance with this invention.

As best shown in FIGS. 3-4, a first solid-state imager 30 and a second solid-state imager 32 are commonly supported on a printed circuit board 18 within the housing (see also FIG. 14). Each imager 30, 32 has a sensor array of image sensors with a field of view diagrammatically shown by speckles in the various views. As described below, the field of view of the first imager 30 is directed out of the upright window 22; hence, the first imager 30 will be individually referred to as the vertical imager 30 for convenience. Similarly, the field of view of the second imager 32 is directed out of the horizontal window 20; hence, the second imager 32 will be individually referred to as the horizontal imager 32 for convenience.

Each imager 30, 32 preferably comprises a two-dimensional, charge coupled device (CCD) array, or a complementary metal oxide semiconductor (CMOS) array, of image sensors of megapixel size, e.g., 1280 pixels wide×960 pixels high. In a preferred embodiment, the field of view of each imager 30, 32 measures about 15 degrees by 30 degrees. The arrays of both imagers 30, 32 extend along mutually perpendicular, row and column, directions. Thus, as shown in FIG. 2, each imager has a row axis and a column axis. Each imager 30, 32 includes an imaging lens assembly 34, 36 (see FIG. 4) for capturing return light from the indicia and for projecting the captured return light onto the respective sensor array.

Each imager 30, 32 preferably has a shutter, typically a global shutter, that exposes each imager for an exposure time, preferably pre-set for the maximum anticipated exposure time needed to capture indicia at the maximum working distance away from each window. By way of example, the maximum exposure time can be set to a value between 400-750 microseconds. Each imager preferably operates at a frame rate of sixty frames per second, each frame lasting about 16.67 milliseconds. The shutter insures that the captured images will not be disturbed by motion of the indicia 14 relative to the window(s) during the exposure time. A rolling or a mechanical shutter could also be employed. The indicia 14 can be presented or swiped at speeds up to around 100 inches per second across any part of either window.

Figure 13:
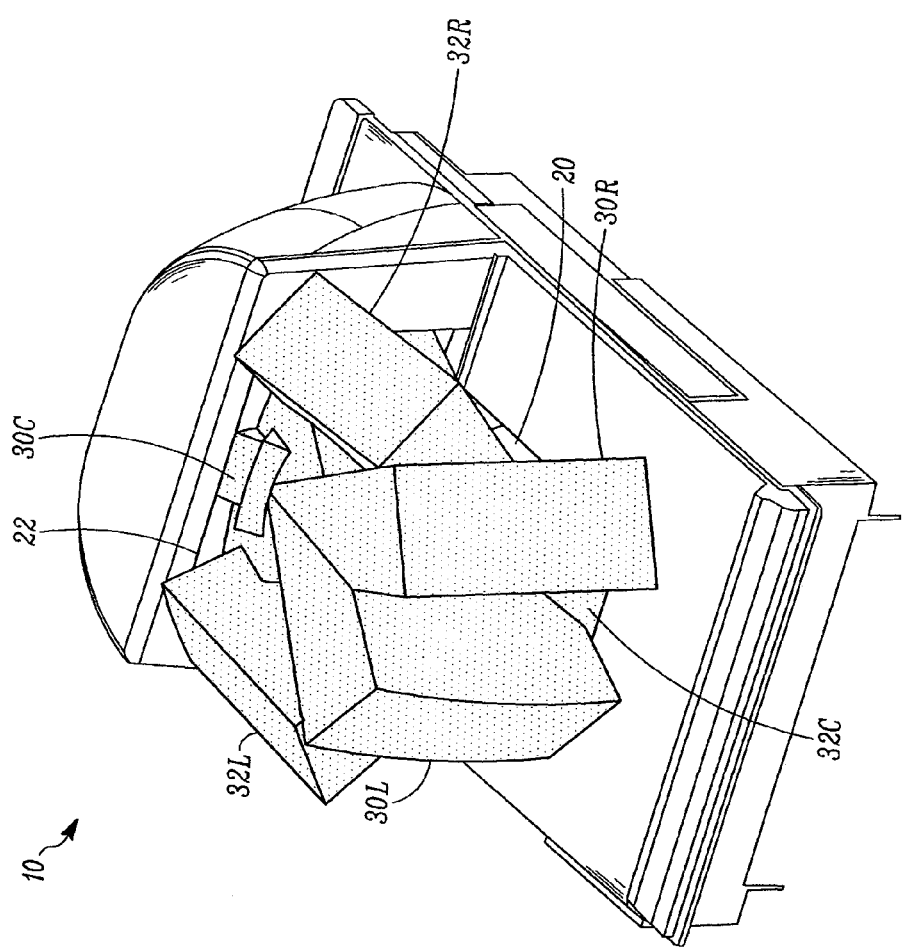
FIG. 13 is a perspective view of the workstation of FIG. 1 diagrammatically depicting all six subfields exteriorly of the windows.

An optical system is supported by the housing 16 and is operative for directing the captured return light along a first folded optical path from the upright window 22 to the vertical imager 30, and along a second folded optical path from the horizontal window 20 to the horizontal imager 32. As described in more detail below, the optical system is further operative for splitting the field of view of the vertical imager 30 into a plurality of subfields of view, namely a center subfield 30C flanked by two outer, right and left, subfields 30R, 30L, and for splitting the field of view of the horizontal imager 32 into a plurality of subfields of view, again a center subfield 32C flanked by two outer, right and left, subfields 32R, 32L. These various subfields outside of the windows 20, 22 are shown in FIG. 13.

The optical system has a plurality of fold mirrors each positioned in each of the first and second optical paths to fold the captured return light in the subfields of view. As shown in FIGS. 3-4, a first plurality of fold mirrors 40, 41, 42, 43 and 44 are positioned along a first optical path part between the vertical imager 30 and the upright window 22 to fold the captured return light in the outer subfield 30L to successively reflect off mirrors 44, 43, 42, 41 and 40, in that order, prior to being focused by the imaging lens assembly 34 onto the vertical imager 30. In analogous manner, a second plurality of fold mirrors 40, 45, 46, 47 and 48 are positioned along a second optical path part between the vertical imager 30 and the upright window 22 to fold the captured return light in the outer subfield 30R to successively reflect off mirrors 48, 47, 46, 45 and 40, in that order, prior to being focused by the imaging lens assembly 34 onto the vertical imager 30. A third plurality of fold mirrors 40, 49 and 50 are positioned along a third optical path part between the vertical imager 30 and the upright window 22 to fold the captured return light in the center subfield 30C to successively reflect off mirrors 50, 49 and 40, in that order, prior to being focused by the imaging lens assembly 34 onto the vertical imager 30.

Figure 5:
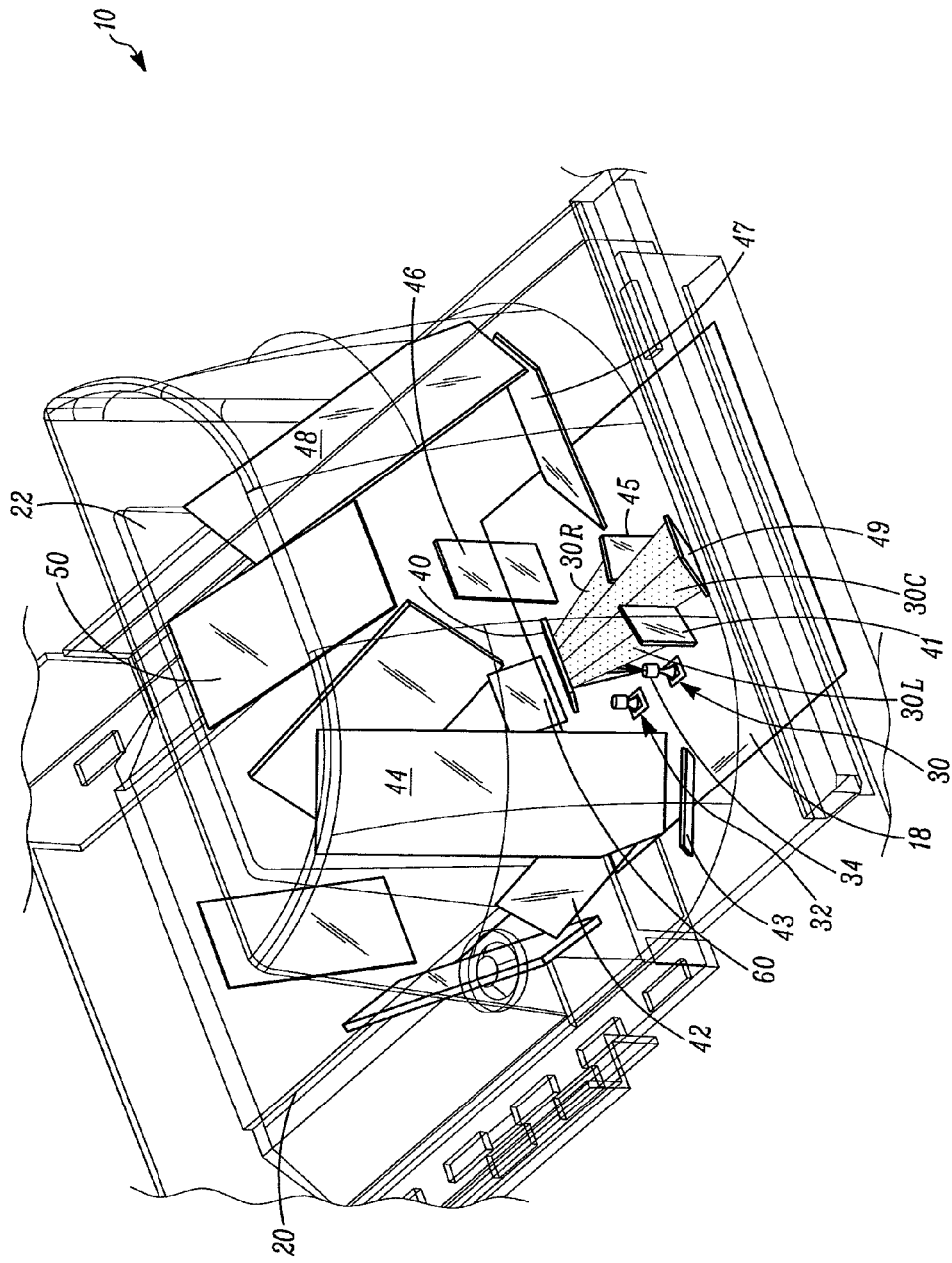
FIG. 5 is a rear perspective view of the optical system part of FIG. 3 depicting an optical splitter for splitting the field of view of the imager into a central subfield of view flanked by two outer subfields of view.
Figure 6:
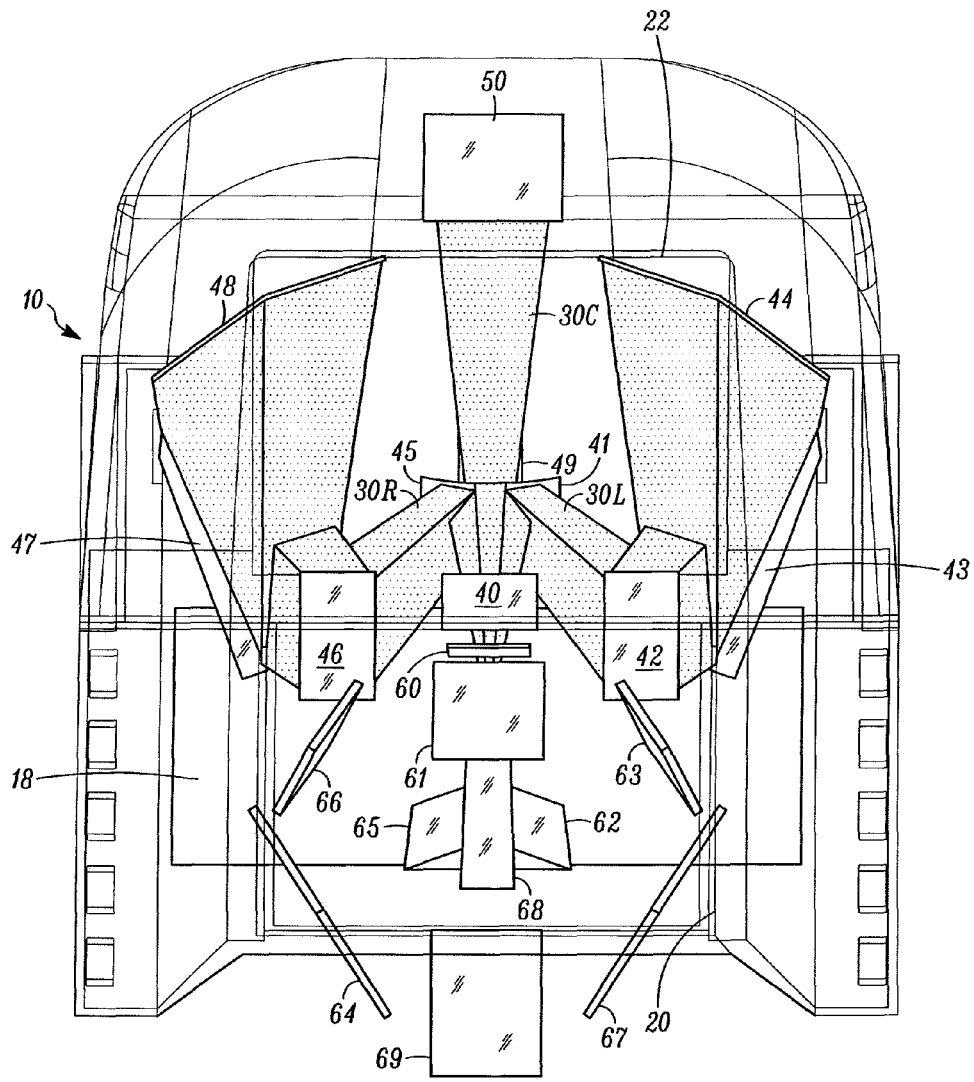
FIG. 6 is a top plan view of the optical system part of FIG. 3 diagrammatically depicting the subfields downstream of the optical splitter.
Figure 7:
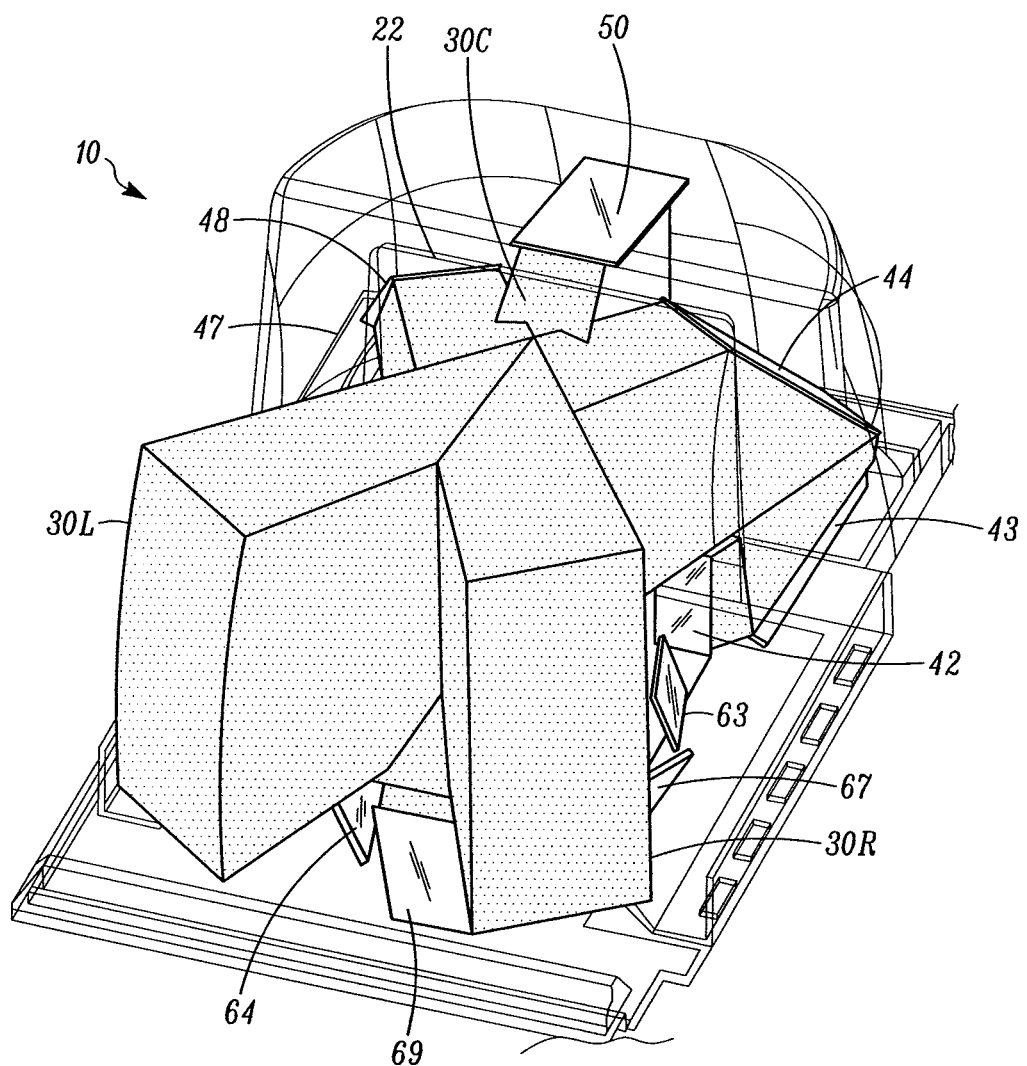
FIG. 7 is a perspective view of the optical system part of FIG. 3 diagrammatically depicting three subfields exteriorly of the upright window of the workstation of FIG. 1.

The aforementioned mirrors 41, 45 and 49, as best seen in FIG. 5, comprise a first optical splitter, wherein the mirror 49 splits a central part of the field of view of the vertical imager 30 into the center subfield 30C, wherein the mirror 41 splits an outer part of the field of view of the vertical imager 30 into the outer subfield 30L, and wherein the mirror 45 splits another outer part of the field of view of the vertical imager 30 into the outer subfield 30R. FIG. 6 best depicts, as seen from above, the separate passage and folding of the outer subfield 30L between the mirrors 44, 43, 42, 41 and 40, as seen from above, and also depicts the separate passage and folding of the outer subfield 30R between the mirrors 48, 47, 46, 45 and 40. FIG. 7 best depicts the separate passage and folding of the outer subfield 30L through the upright window 22 and onto the mirror 44, and the separate passage and folding of the outer subfield 30R through the upright window 22 and onto the mirror 48.

The above discussion for FIGS. 3-7 dealt with the various fold mirrors of the optical system for folding and splitting the subfields 30C, 30L and 30R between the upright window 22 and the vertical imager 30. The following discussion of FIGS. 8-12 deals with additional fold mirrors of the optical system for folding and splitting additional subfields 32C, 32L and 32R between the horizontal window 20 and the horizontal imager 32.

Figure 8:
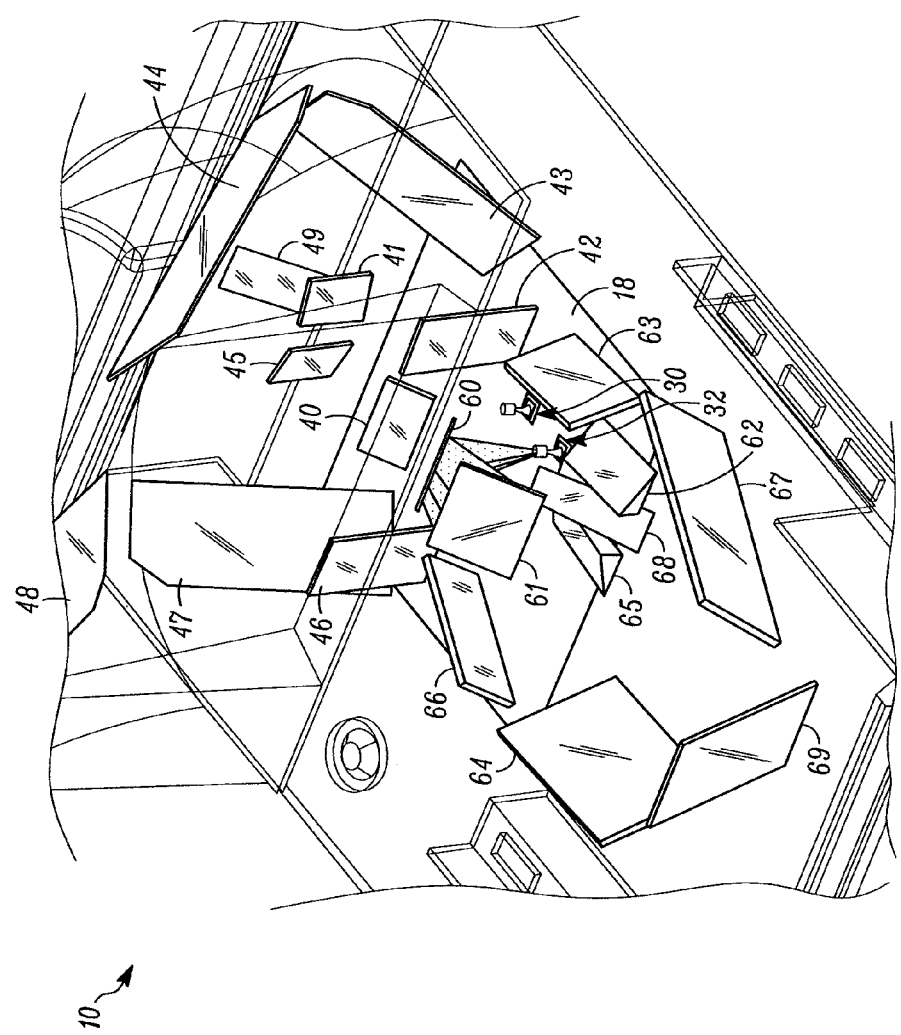
FIG. 8 is a broken-away, enlarged, perspective view of another part of the optical system in the workstation of FIG. 1 diagrammatically depicting part of another folded optical path of the field of view of another imager prior to reaching another optical splitter.
Figure 9:
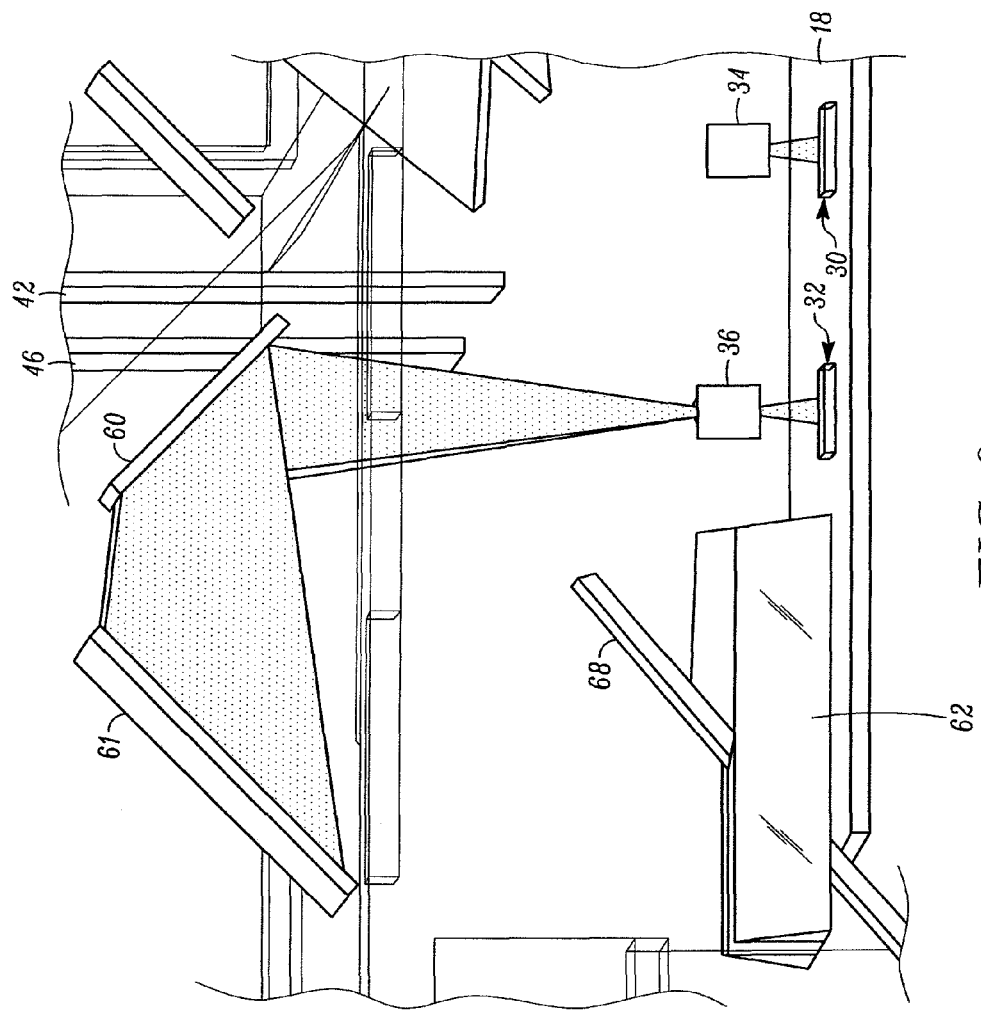
FIG. 9 is a side perspective, enlarged, view of the optical path part of FIG. 8.

Thus, the optical system, as best shown in FIGS. 8-9, includes a fourth plurality of fold mirrors 60, 61, 62, 63 and 64 that are positioned along a first optical path part between the horizontal imager 32 and the horizontal window 20 to fold the captured return light in the outer subfield 32R to successively reflect off mirrors 64, 63, 62, 61 and 60, in that order, prior to being focused by the imaging lens assembly 36 onto the horizontal imager 32. In analogous manner, a fifth plurality of fold mirrors 60, 61, 65, 66 and 67 are positioned along a second optical path part between the horizontal imager 32 and the horizontal window 20 to fold the captured return light in the outer subfield 32L to successively reflect off mirrors 67, 66, 65, 61 and 60, in that order, prior to being focused by the imaging lens assembly 36 onto the horizontal imager 32. A sixth plurality of fold mirrors 60, 61, 68 and 69 are positioned along a third optical path part between the horizontal imager 32 and the horizontal window 20 to fold the captured return light in the center subfield 32C to successively reflect off mirrors 69, 68, 61 and 60, in that order, prior to being focused by the imaging lens assembly 36 onto the horizontal imager 32.

The aforementioned mirrors 62, 65 and 68, as best seen in FIG. 8, comprise a second optical splitter, wherein the mirror 68 splits a central part of the field of view of the horizontal imager 32 into the center subfield 32C, wherein the mirror 62 splits an outer part of the field of view of the horizontal imager 32 into the outer subfield 32R, and wherein the mirror 65 splits another outer part of the field of view of the horizontal imager 32 into the outer subfield 32L.

Figure 10:
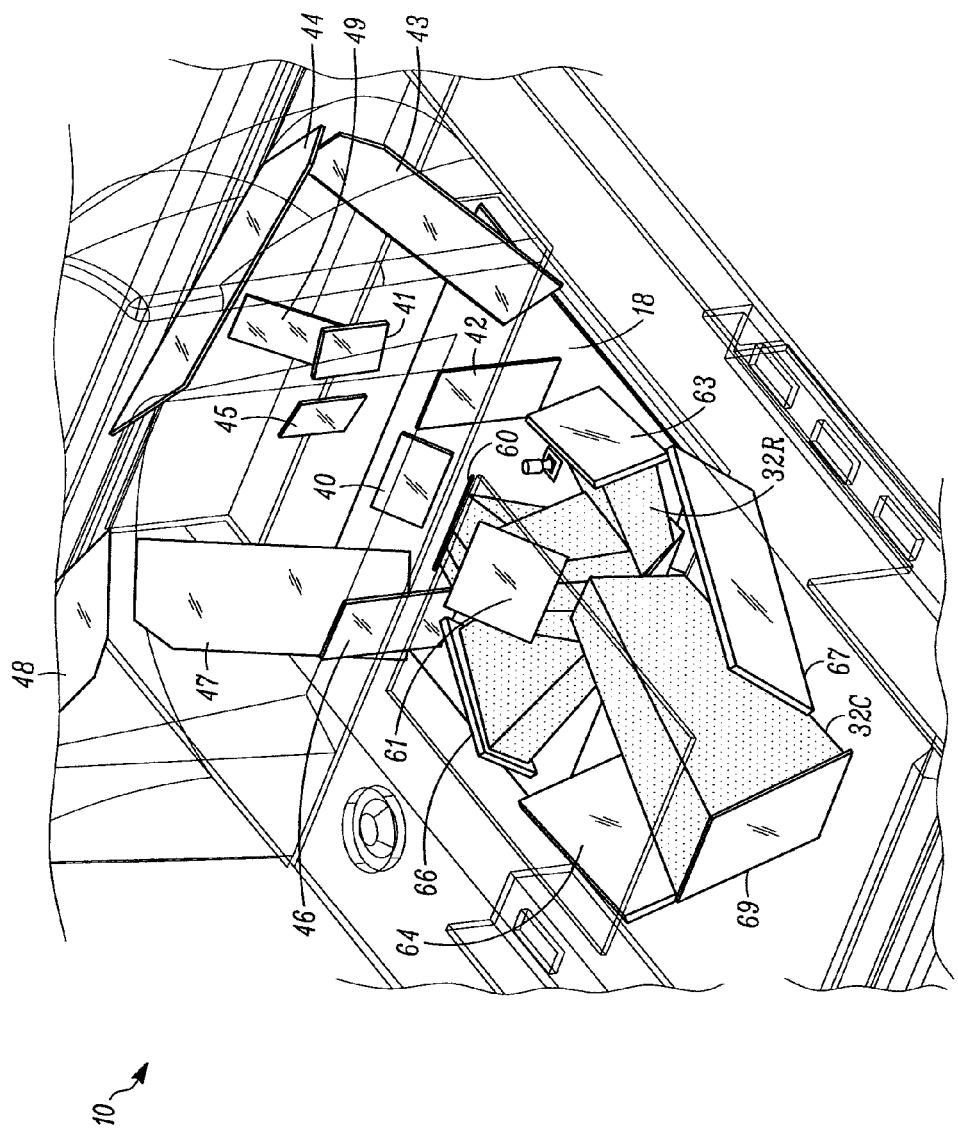
FIG. 10 is a perspective view diagrammatically depicting the subfields downstream of the optical splitter of FIG. 8.
Figure 11:
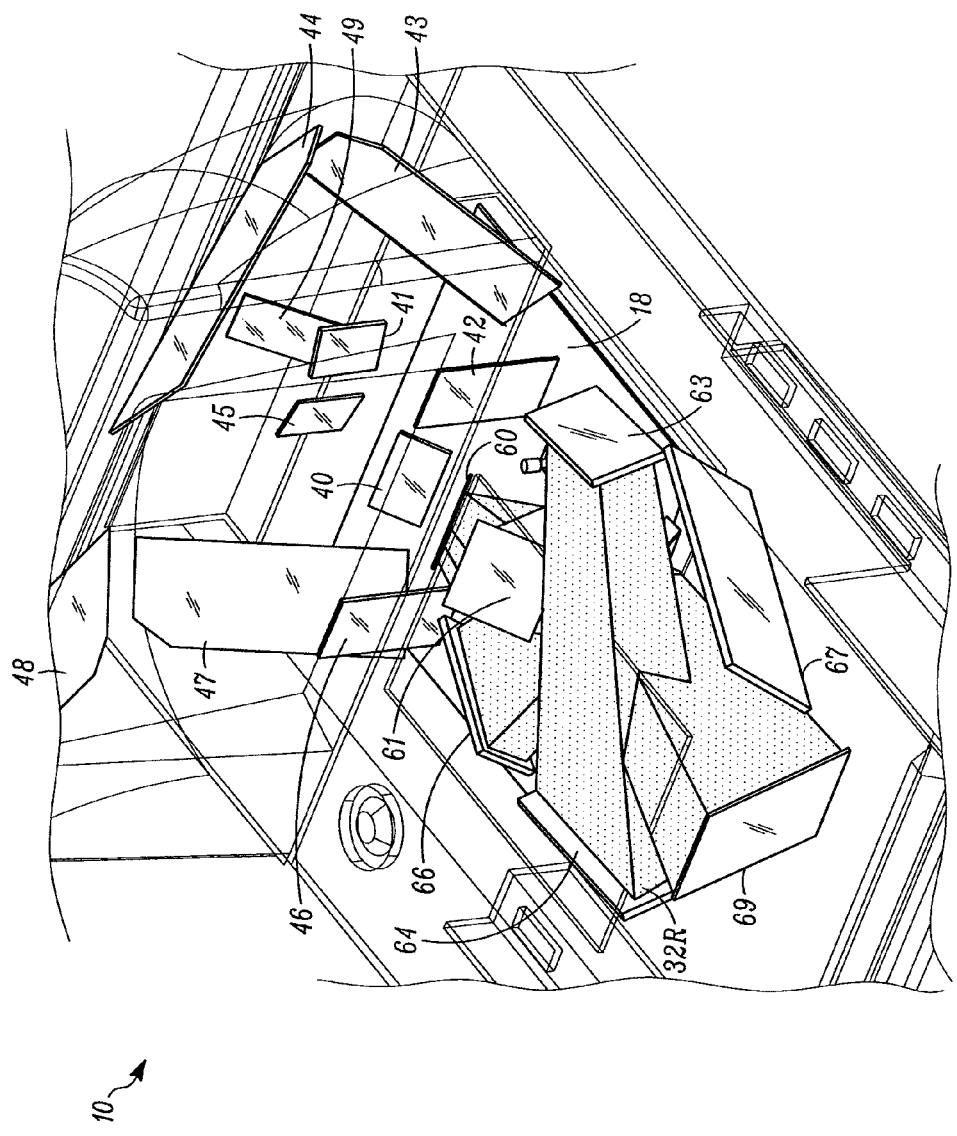
FIG. 11 is a perspective view diagrammatically depicting the subfields still further downstream of the optical splitter of FIG. 8.
Figure 12:
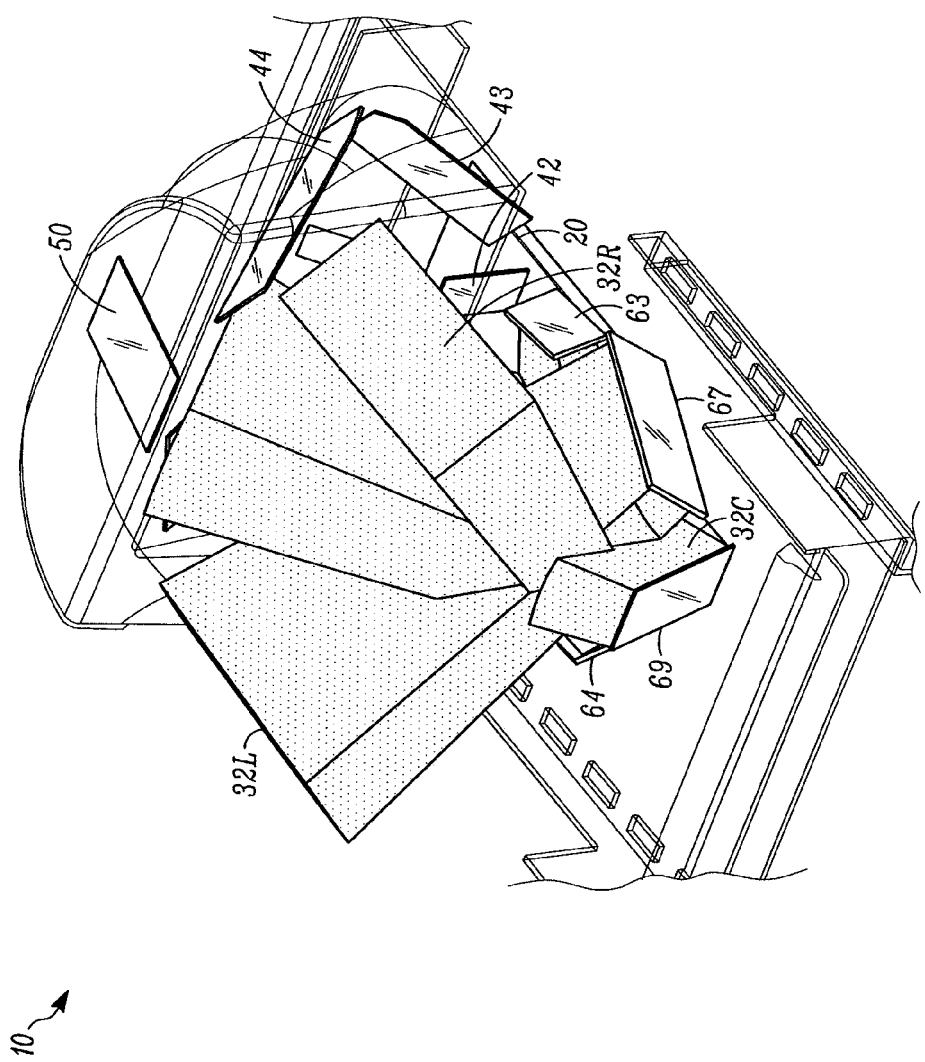
FIG. 12 is a perspective view of the other optical system part of FIG. 8 diagrammatically depicting three subfields exteriorly of the horizontal window of the workstation of FIG. 1.

FIG. 9 best depicts the folding of all three subfields between the mirrors 61 and 60 and the horizontal imager 32 away from the second optical splitter 62, 65 and 68. FIG. 10 best depicts the separate passage and folding of the outer subfield 32R between the mirrors 62 and 63, and also depicts the separate passage and folding of the outer subfield 32L between the mirrors 45 and 66, and also depicts the separate passage and folding of the central subfield 32C between the mirrors 68 and 69. FIG. 11 best depicts the separate passage and folding of the outer subfield 32R between the mirrors 63 and 64; in analogous manner, it will be understood that the outer subfield 32L passes between the mirrors 66 and 67 (not illustrated so as not to encumber the drawing). FIG. 12 best depicts the separate passage and folding of the outer subfield 32R through the horizontal window 20 and onto the mirror 64, and the separate passage and folding of the outer subfield 32L through the horizontal window 20 and onto the mirror 67, and the separate passage and folding of the central subfield 32C through the horizontal window 20 and onto the mirror 69.

The use of the aforementioned two optical splitters reduces the number of imagers in the workstation 10. Thus, only two imagers 30, 32 are preferably needed to produce the six subfields 30C, 30L, 30R, 32C, 32L and 32R depicted in FIG. 13. These six subfields provide optimum visibility of indicia 14 on the various sides of the product 12 being passed through the scan zone. The six subfields are oriented to be most effective for reading indicia on products oriented in the most common ways presented to the workstation by users. The six subfields provides redundant coverage for the indicia located in common positions on the products, thereby assuring maximum performance when used by typical users.

As best seen in FIG. 14, energizable illuminators 70C1, 70C2 are mounted in spaced-apart elation rearwardly on board 18 for illuminating central subfield 30C; energizable illuminator 70R is mounted rearwardly on board 18 for illuminating outer subfield 30R; and energizable illuminator 70L is mounted rearwardly on board 18 for illuminating outer subfield 30L. Each illuminator is operative for illuminating its respective subfield with illumination light over an adjustable illumination time, preferably in a range of about 0.25 to about 0.75 milliseconds. Each illuminator preferably includes multiple illumination light sources, e.g., surface-mounted light emitting diodes (LEDs). The imaging lens assembly 34 is operative for capturing the illumination light returned from the indicia in each subfield 30C, 30R and 30L along respective optical paths from the upright window 22 to the vertical imager 30. Non-illustrated illumination lenses overlie each illuminator to shape the outgoing illumination light and insure that the illumination light substantially fills the subfields 30C, 30R and 30L.

Figure 16:
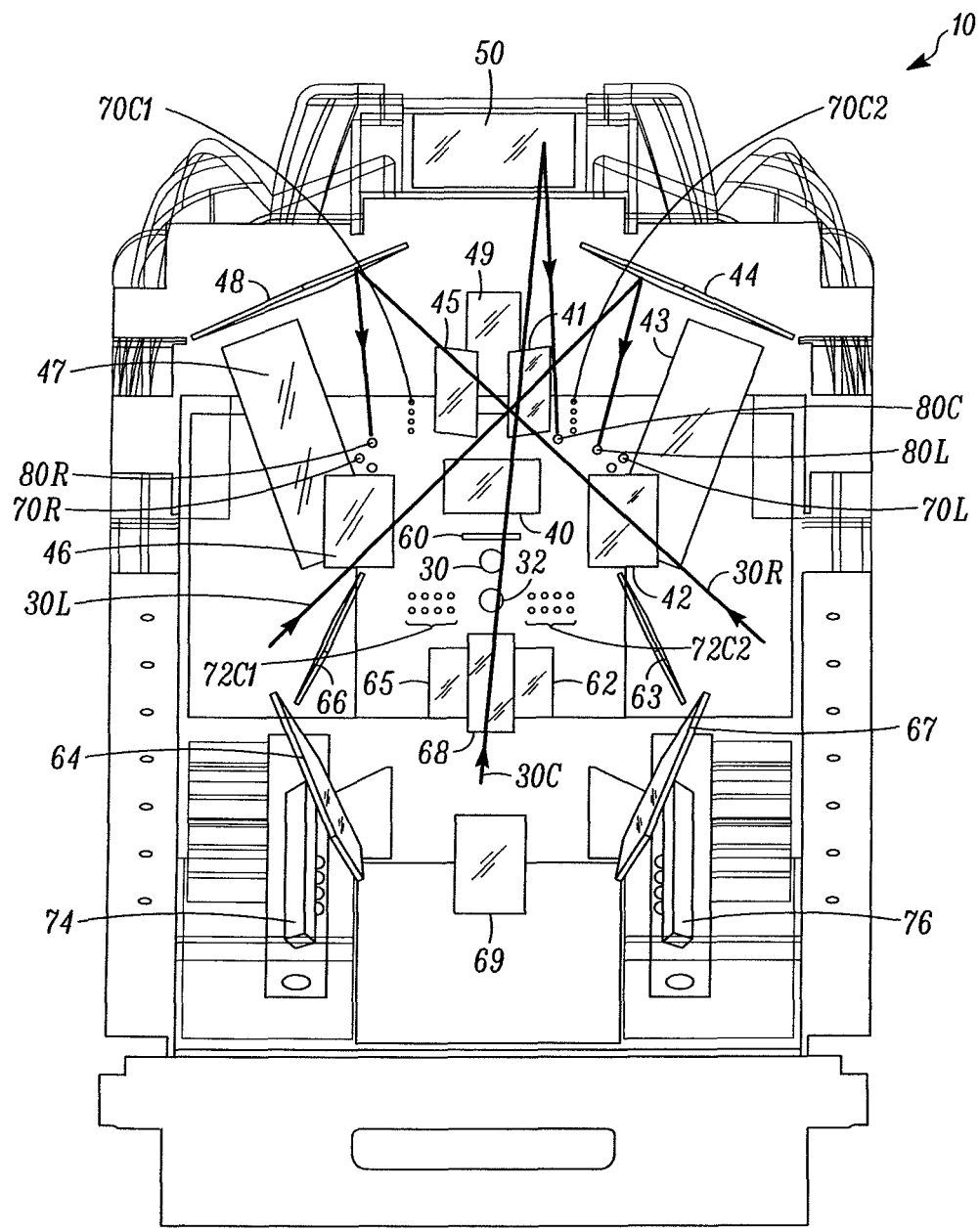
FIG. 16 is a top perspective view of the workstation of FIG. 1 diagrammatically depicting three exposure sensors and the monitoring of their associated three subfields that pass through the upright window of FIG. 1 in accordance with this invention.

In accordance with one feature of this invention, exposure sensor 80C is mounted rearwardly on board 18 for sensing the returned illumination light in illuminated subfield 30C; exposure sensor 80R is mounted rearwardly on board 18 for sensing the returned illumination light in illuminated subfield 30R; and exposure sensor 80L is mounted rearwardly on board 18 for sensing the returned illumination light in illuminated subfield 30L. Each exposure sensor 80C, 80R and 80L, e.g., a photodetector, is positioned externally of the imager 30 and of the illuminators 70C1, 70C2, 70R and 70L. FIG. 16 is an overhead view that depicts the exposure sensors 80C, 80R and 80L, and diagrammatically depicts, with arrows, the respective paths along which the incoming returned illumination light in subfields 30C, 30R and 30L travel to the exposure sensors 80C, 80R and 80L, respectively. The exposure sensors 80C, 80R and 80L are situated, and may even be slightly tilted, so that their individual fields of view substantially overlap the illuminated subfields 30C, 30R and 30L.

Figure 15:
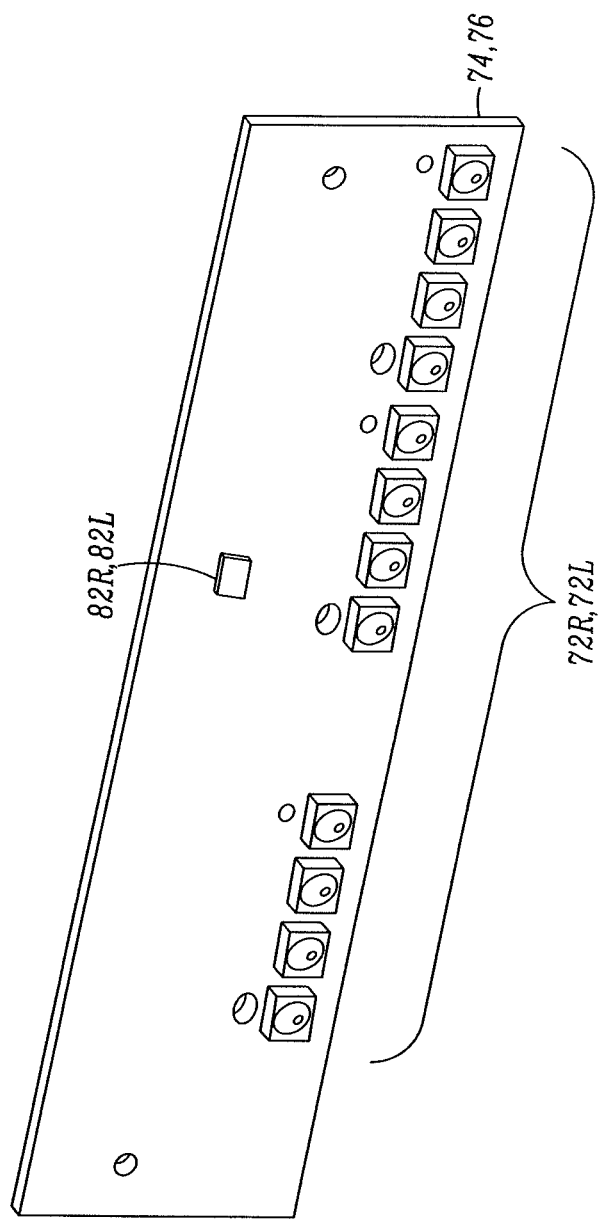
FIG. 15 is a perspective view of an illuminator and an exposure sensor commonly mounted on an auxiliary printed circuit board within the workstation of FIG. 1 in accordance with this invention.
Figure 17:
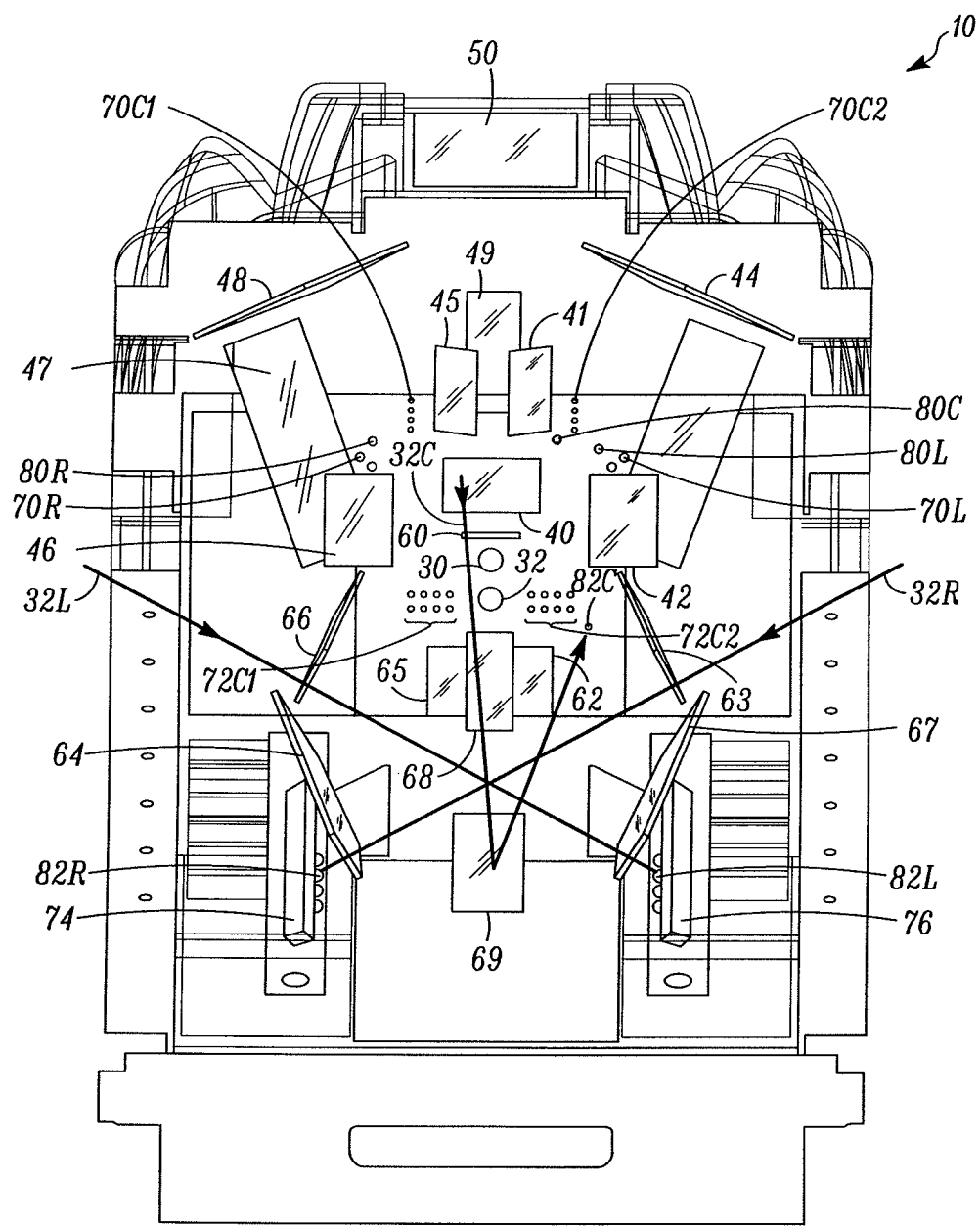
FIG. 17 is a top perspective view of the workstation of FIG. 1 diagrammatically depicting three exposure sensors and the monitoring of their associated three subfields that pass through the horizontal window of FIG. 1 in accordance with this invention.

Analogously, as also seen in FIG. 14, energizable illuminators 72C1, 72C2 are mounted in spaced-apart relation forwardly on board 18 for illuminating central subfield 32C. Energizable illuminator 72R is mounted on an auxiliary printed circuit board 74 (shown in isolation in FIG. 15) for illuminating outer subfield 32R; and energizable illuminator 72L is mounted rearwardly on another auxiliary board 76 (again, see FIG. 15) for illuminating outer subfield 32L. FIG. 17 is an overhead view that shows the placement of the auxiliary boards 74, 76. Analogously to that described above, each illuminator 72C1, 72C2, 72R and 72L is operative for illuminating its respective subfield with illumination light over an adjustable illumination time, preferably in a range of about 0.25 to about 0.75 milliseconds. Each illuminator preferably includes multiple illumination light sources, e.g., surface-mounted light emitting diodes (LEDs). FIG. 15 shows such LEDs 72R or 72L on an enlarged scale. The imaging lens assembly 36 is operative for capturing the illumination light returned from the indicia in each subfield 32C, 32R and 32L along respective optical paths from the horizontal window 22 to the horizontal imager 32. Non-illustrated illumination lenses overlie each illuminator to shape the outgoing illumination light and insure that the illumination light substantially fills the subfields 32C, 32R and 32L.

Analogously, as also seen in FIG. 14, exposure sensor 82C is mounted forwardly on board 18 for sensing the returned illumination light in illuminated subfield 32C; exposure sensor 82R is mounted on auxiliary board 74 for sensing the returned illumination light in illuminated subfield 32R; and exposure sensor 82L is mounted on auxiliary board 76 for sensing the returned illumination light in illuminated subfield 30L. Each exposure sensor 82C, 82R and 82L, e.g., a photodetector, is positioned externally of the imager 32 and of the illuminators 72C1, 72C2, 72R and 72L. FIG. 17 is an overhead view that depicts the exposure sensors 82C, 82R and 82L, and diagrammatically depicts, with arrows, the respective paths along which the incoming returned illumination light in subfields 32C, 32R and 32L travel to the exposure sensors 82C, 82R and 82L, respectively. The exposure sensors 82C, 82R and 82L are situated, and may even be tilted, so that their individual fields of view substantially overlap the illuminated subfields 32C, 32R and 32L.

A controller 24 or programmed microprocessor is mounted on the board 18 and is operatively connected to the imagers 30, 32; the illuminators 70C1, 70C2, 70R, 70L, 72C1, 72C2, 72R and 72L; and the exposure sensors 80C, 80R, 80L, 82C, 82R, 82L, for energizing each illuminator to illuminate each subfield of view, for deenergizing each illuminator when the returned illumination light sensed by the respective exposure sensors exceeds a threshold, and for processing the captured illumination light in at least one of the subfields of view to read the indicia, and to decode the indicia if the indicia is a symbol. Preferably, the illuminators 70C1, 70C2, 70R and 70L are simultaneously energized as a first group, and thereafter, the illuminators 72C1, 72C2, 72R and 72L are simultaneously energized as a second group.

Each exposure sensor senses and measures the brightness or intensity level of the return illumination light in its subfield, and its output is integrated. When its integrated output reaches the threshold, the associated illuminator for that subfield is deenergized. The threshold corresponds to the correct exposure for the respective imager. Each imager may continue its exposure until its preset exposure time is reached, but once the respective illumination light has been terminated by the respective exposure sensor, no significant amount of additional ambient light will be captured.

Thus, each subfield of view is illuminated by its own individually dedicated illuminator, and the intensity level of the returned illumination light in each subfield of view is sensed and measured by its own individually dedicated exposure sensor. The illumination time of each illuminator in each subfield of view is separately adjusted. For example, reading indicia in a near range of working distances close to a window will need a shorter illumination time as compared to reading indicia in a far range of working distances remote from the window. Similarly, one subfield may be looking at one side of a product, while another subfield may be looking at another side of the same product. These two product sides will not necessarily be located at the same working distance, and may not even be illuminated to the same extent.

The individual exposure control of this invention allows different exposures in different subfields of view of an imager. A single auto-exposure circuit internal to a single imager cannot provide different exposure times in different portions of its field of view. The individual exposure control of this invention promotes the use of optical splitters and reduces the number of imagers needed in the workstation.

In use, an operator, such as a person working at a supermarket checkout counter, or a customer in a self checkout stand, processes the product 12 bearing the UPC symbol 14 thereon, past the windows 20, 22 by swiping the product 12 across a respective window, or by presenting the product 12 at the respective window. The symbol 14 may located on any of the top, bottom, right, left, front and rear, sides of the product 12, and at least one, or perhaps both, of the imagers 30, 32 will capture the illumination light reflected, scattered, or otherwise returning from the symbol 14 through one or both windows 20, 22. All three of the subfields 32C, 32R and 32L pass through the horizontal window 20 along different intersecting directions to read three sides of the product. All three of the subfields 30C, 30R and 30L pass through the upright window 22 along different intersecting directions to read three more sides of the product. As shown in FIG. 13, the six subfields substantially fully occupy the scan zone. All six subfields are individually illuminated by their dedicated illuminators. Dedicated external exposure sensors detect the illumination in the individual subfields, and terminate the illumination in each subfield when the correct exposure level for the respective imager has been determined.

It will be understood that each of the elements described above, or two or more together, also may find a useful application in other types of constructions differing from the types described above.

While the invention has been illustrated and described as embodied in a point-of transaction workstation for electro-optically reading indicia by using two imagers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A point-of-transaction workstation for processing products by electro-optically imaging indicia associated with the products, comprising:
    a housing;
    at least one window supported by the housing;
    at least one solid-state imager supported by the housing and having an array of image sensors with a field of view;
    an optical system supported by the housing and operative for splitting the field of view of the at least one imager into a plurality of subfields of view that simultaneously extend through the at least one window over regions of the product;
    a plurality of energizable illuminators, one for each subfield of view, for illuminating each subfield of view with illumination light over an adjustable illumination time, the optical system being further operative for capturing the illumination light returned from the indicia in each subfield of view along respective optical paths from the at least one window to the at least one imager;
    a plurality of exposure sensors, one for each subfield of view, and external of the at least one imager, for sensing the returned illumination light in each subfield of view; and
    a controller operatively connected to the at least one imager, the illuminators, and the exposure sensors, for energizing each illuminator to illuminate each subfield of view, for deenergizing each illuminator to terminate the illumination light returned from the indicia when the illumination light returned from the indicia sensed by the respective exposure sensors exceeds a threshold, and for processing the captured illumination light in at least one of the subfields of view.

2. The workstation of claim 1, wherein the at least one window is located in an upright plane; and further comprising another window located in a generally horizontal plane that intersects the upright plane, and another solid-state imager supported by the housing and having another array of sensors with another field of view.

3. The workstation of claim 2, wherein the optical system includes a first optical splitter for splitting the field of view of the at least one imager into a set of the subfields of view that pass through the at least one window, and a second optical splitter for splitting the other field of view of the other imager into a set of the subfields of view that pass through the other window.

4. The workstation of claim 1, wherein each illuminator includes a plurality of light emitting diodes (LEDs), and wherein each exposure sensor is a photodetector, and wherein the photodetector and the LEDs associated with each subfield of view are commonly mounted on a printed circuit board.

5. The workstation of claim 1, wherein the at least one imager has a global shutter that exposes the array of image sensors for an exposure time pre-set for a maximum anticipated exposure time needed to capture the indicia at a maximum working distance away from the at least one window.

6. A point-of-transaction workstation for processing products by electro-optically imaging indicia associated with the products, comprising:
    a housing having one window located in an upright plane, and another window located in a generally horizontal plane that intersects the upright plane, the windows bounding an area in which each product is presented for processing;
    a pair of solid-state imagers, one for each window, supported by the housing, each imager having an array of image sensors with a field of view;
    an optical system supported by the housing and operative for splitting the field of view of at least one of the imagers into a plurality of subfields of view that simultaneously extend through at least one of the windows over regions of the product;
    a plurality of energizable illuminators, one for each subfield of view, for illuminating each subfield of view with illumination light over an adjustable illumination time, the optical system being further operative for capturing the illumination light returned from the indicia in each subfield of view along respective optical paths from the at least one window to the at least one imager;
    a plurality of exposure sensors, one for each subfield of view, and external of the at least one imager, for sensing the returned illumination light in each subfield of view; and
    a controller operatively connected to the at least one imager, the illuminators, and the exposure sensors, for energizing each illuminator to illuminate each subfield of view, for deenergizing each illuminator to terminate the illumination light returned from the indicia when the illumination light returned from the indicia sensed by the respective exposure sensors exceeds a threshold, and for processing the captured illumination light in at least one of the subfields of view.

7. The workstation of claim 6, wherein the optical system includes a first optical splitter for splitting the field of view of the at least one imager into three subfields of view that pass through the at least one window, and a second optical splitter for splitting the other field of view of the other imager into three subfields of view that pass through the other window.

8. The workstation of claim 6, wherein each illuminator includes a plurality of light emitting diodes (LEDs), and wherein each exposure sensor is a photodetector, and wherein the photodetector and the LEDs associated with each subfield of view are commonly mounted on a printed circuit board.

9. A method of processing products by electro-optically imaging indicia associated with the products, the method comprising the steps of:
    supporting at least one window and at least one solid-state imager having an array of image sensors with a field of view on a housing;
    splitting the field of view of the at least one imager into a plurality of subfields of view that simultaneously extend through the at least one window over regions of the product;
    illuminating each subfield of view with illumination light over an adjustable illumination time with a plurality of energizable illuminators, one for each subfield of view;
    capturing the illumination light returned from the indicia in each subfield of view along respective optical paths from the at least one window to the at least one imager;
    sensing the returned illumination light in each subfield of view with a plurality of exposure sensors, one for each subfield of view, and positioning the exposure sensors externally of the at least one imager;

energizing each illuminator to illuminate each subfield of view;

deenergizing each illuminator to terminate the illumination light returned from the indicia when the illumination light returned from the indicia sensed by the respective exposure sensors exceeds a threshold; and processing the captured illumination light in at least one of the subfields of view.

10. The method of claim 9, and further comprising the steps of locating the at least one window in an upright plane; locating another window in a generally horizontal plane that intersects the upright plane; and supporting another solid-state imager having another array of sensors with another field of view on the housing.

11. The method of claim 10, wherein the splitting step is performed by splitting the field of view of the at least one imager with a first optical splitter into a set of the subfields of view that pass through the at least one window, and by splitting the other field of view of the other imager with a second optical splitter into a set of the subfields of view that pass through the other window.

12. The method of claim 9, and the steps of configuring each illuminator as a plurality of light emitting diodes (LEDs); configuring each exposure sensor as a photodetector; and commonly mounting the photodetector and the LEDs associated with each subfield of view on a printed circuit board.

13. The method of claim 9, and configuring the at least one imager with a global shutter that exposes the array of image sensors for an exposure time pre-set for a maximum anticipated exposure time needed to capture the indicia at a maximum working distance away from the at least one window.

* * * * *